(12) United States Patent
Sieben et al.

(10) Patent No.: US 10,284,698 B1
(45) Date of Patent: May 7, 2019

(54) SPEECH STATION FOR INTERCOM NETWORK

(71) Applicant: RIEDEL Communications International GmbH, Wuppertal (DE)

(72) Inventors: Hubert Sieben, Wuppertal (DE); Jake Dodson, Wuppertal (DE); Thomas Riedel, Wuppertal (DE)

(73) Assignee: RIEDEL COMMUNICATIONS INTERNAIONAL GMBH, Wuppertal (DE)

(*) Notice: Subject to any disclaimer, the term of this patent is extended or adjusted under 35 U.S.C. 154(b) by 0 days.

(21) Appl. No.: 16/104,007

(22) Filed: Aug. 16, 2018

(30) Foreign Application Priority Data

Nov. 28, 2017 (DE) .......................... 10 2017 128 115
Feb. 14, 2018 (DE) .......................... 10 2018 103 272

(51) Int. Cl.
*H04M 9/00* (2006.01)
*H04M 1/03* (2006.01)
(Continued)

(52) U.S. Cl.
CPC .......... *H04M 1/03* (2013.01); *H04M 1/72513* (2013.01); *H04M 3/56* (2013.01); *H04M 9/007* (2013.01)

(58) Field of Classification Search
CPC ...... H04M 1/05; H04M 3/56; H04M 1/72513; H04M 9/00; H04M 9/007
(Continued)

(56) References Cited

U.S. PATENT DOCUMENTS 7,400,716 B1 * 7/2008 Gibson, Sr. ......... H04M 1/0291
379/167.01
2002/0054153 A1  5/2002 Arnold
(Continued)

FOREIGN PATENT DOCUMENTS

DE          2636849 A1     8/1976

OTHER PUBLICATIONS

D40AB Benutzerhandbuch, D40AB_UserGuide-V2144x204_GER. indd 1, Dec. 5, 2011.
(Continued)

*Primary Examiner* — Melur Ramakrishnaiah
(74) *Attorney, Agent, or Firm* — Andrew Wilford (57) ABSTRACT

The invention relates, inter alia, to a speech station (10) for an intercom network (11), comprising an in particular parallepipedal housing (12), with a housing front (13) and a rear housing side (14), wherein a plurality of programmable operator controls (15a, 15b, 15c, 15d) and multiple displays (16a, 16b, 16c, 16d) are tightly packed on the housing front (13), wherein the operator controls comprise a plurality of selector keys (17a, 17b, 17c, 17d), wherein the speech station as a result of a selector key being actuated by an operator provides a direct listen and/or talk connection to a selected other speech station (18a, 18b) of the intercom network via a switching station (19), wherein a plurality of connectors (20a, 20b, 20c, 20d), such as power-supply connector, data cable connector, BNC connector, are mounted on the rear housing side (14), wherein at least one loudspeaker (24a, 24b) is fixed on the speech station, wherein the loudspeaker is accommodated in a seat (25) between the housing front (13) and rear housing side (14), offset to the rear (26) relative to the housing front (13), and wherein the loudspeaker (24a, 24b) has a sound exit surface (27) from which the sound is propagated to an opening (28)
(Continued)

in the housing front (13), wherein the opening has an opening cross-section (29) that amounts to only a fraction of the sound exit surface (27).

17 Claims, 9 Drawing Sheets

(51) Int. Cl.
*H04M 3/56* (2006.01)
*H04M 1/725* (2006.01)

(58) Field of Classification Search
USPC ..... 379/159, 167.01, 167.05, 167.07, 167.12
See application file for complete search history.

(56) References Cited

U.S. PATENT DOCUMENTS

| | | |
|---|---|---|
| 2003/0003945 A1 | 1/2003 | Saiki et al. |
| 2006/0051075 A1 | 3/2006 | Wada |
| 2006/0078138 A1 | 4/2006 | Wada |
| 2006/0153417 A1 | 7/2006 | Furuya |
| 2008/0158189 A1 | 7/2008 | Kim |
| 2009/0291718 A1* | 11/2009 | Fukazawa ............... H04M 1/03 455/575.1 |
| 2011/0007883 A1* | 1/2011 | Bingham ............. H04M 11/025 379/93.17 |
| 2013/0094686 A1 | 4/2013 | Shin et al. |
| 2016/0050505 A1 | 2/2016 | Riedel |
| 2018/0166836 A1 | 6/2018 | Fritz |
| 2018/0198635 A1 | 7/2018 | Lee |
| 2018/0288207 A1 | 10/2018 | Riedel |
| 2018/0288527 A1 | 10/2018 | Riedel |
| 2018/0288595 A1 | 10/2018 | Lee |

OTHER PUBLICATIONS

Wikipedia "Telefonanlage" "https://de.wikipedia.org/index.php?title=Telefonanlage&oldid=168223548", Oct. 18, 2018.
Wikipedia"Rack",https://de.wikipedia.org/w/index.php?title=Rack&oldid=168602559.

* cited by examiner

SPEECH STATION FOR INTERCOM NETWORK

The invention relates to a speech station for an intercom network according to claim 1.

The applicant has been developing and manufacturing intercom networks and their parts, called speech stations, for more than 30 years.

Speech stations of the prior art are disclosed in patent application DE 10 2014 011 963 [US 2016/0050505] and the subsequently published patent applications DE 10 2017 107 148 [US 2018/0288595], DE 10 2017 107 150 [US 2018/0198635], DE 10 2017 106 946 [US 2018/0166836], DE 10 2017 116 002 [US 2018/0288527], DE 10 2017 116 273 [US 2018/0288207] of the Applicant.

Speech stations of the type according to the invention are used in intercom networks. Audio data is transmitted via an intercom network. Intercom networks in this respect provide very complex networks of intercommunication systems, as used in the events sector, for live events, e.g. at sports events and music events.

The term "speech station" in the context of the present patent application is also used as a synonym for the terms "intercom panel", "intercom unit", "intercom station" or "member of an intercom network".

Speech stations of the known type have a plurality of operator controls, function keys, selector keys, connectors and displays on their housing fronts or front sides. The space or the arrangement surface available on the housing front is limited. The space for arranging the operator controls, function elements, connectors and displays is limited for example because the speech station is intended to have dimensions that make it possible for a speech station to be inserted into a predetermined rack, i.e. into an mounting frame, for the purpose of fixing the speech station to the rack. Speech stations that can be placed on a desk are also known.

In any case, because of the predetermined dimensions of a mounting frame on the one hand one dimension of the speech station is also predetermined: on the other hand, there is the need to accommodate as many different operator controls and function elements and also displays as possible. The arrangement surface for the plurality of instruments cannot however be increased at will.

Starting from this point, the object of the invention is to develop further a speech station of the known type such that an improved way of arranging function elements, operator controls and/or connectors and/or displays on the housing front is provided.

The invention achieves these objects with the features of claim 1.

According to the invention, at least one loudspeaker is fixed on the speech station. Advantageously, two or even more loudspeakers are fixed on the speech station.

The loudspeaker is accommodated according to the invention in a seat between the housing front and the rear housing side. In this case it is arranged offset to the rear relative to the housing front. This means that the loudspeaker is not located directly behind a front housing plate, as in the prior art, but is arranged relative thereto clearly, that is to say by at least several millimeters, advantageously several centimeters, spaced apart from the inner side of the wall of the housing that forms the housing front, and offset to the rear.

The loudspeaker comprises a sound exit surface. This is in particular a conventional diaphragm of a substantially conventionally designed loudspeaker. The sound exit surface may for example be designed to be circular. It may however alternatively have a different contour.

From the sound exit surface, the sound emitted by the loudspeaker is propagated to an opening in the housing front. According to the invention, provision is made for the opening in the housing front to have an opening cross-section that is considerably smaller than the sound exit surface. The opening has an opening cross-section that amounts to only a fraction of the sound exit surface. The opening cross-section in this case is at least smaller than half of the sound exit surface.

A "fraction" in the context of the present patent application is understood to mean a portion that in any case is not greater than 50%.

Due to the loudspeaker being spaced apart from the housing front, a duct that serves for conducting sound and that for example also makes it possible to provide an acoustic horn can be formed within the housing. Along this sound-conducting space or duct, the sound emitted by the loudspeaker is compressed, and concentrated onto a small opening in the housing front. The sound can emerge through this small opening. Owing to the fact that the loudspeaker is arranged spaced apart from the housing front, namely offset to the rear, additional arrangement or positioning surfaces become free on the housing front, along which further operator controls or displays or connectors, or at any rate regions or portions of operator controls, or regions or portions of displays, can be arranged.

In the prior art, considerable portions of the surface of the housing front were reserved for the loudspeaker. Along with this, the loudspeaker was arranged and/or mounted directly on the housing front. In contrast, owing to the change according to the invention in the position of the loudspeaker more arrangement space for the elements and displays can be gained on the housing front. According to the invention, however, this does not result in the audio quality being adversely affected. Here, as a particular measure, such as for example by arranging a separate acoustic horn, particularly advantageous and optimized conducting and compression of sound waves from the sound exit surface up to the small opening can be achieved.

It is covered by the invention in particular if also only a single opening on the housing front is associated with each sound exit surface of a loudspeaker. In one variant of the invention, the opening may however also be subdivided into multiple partial openings. The partial openings may also be arranged spaced apart from one another on the housing front. It is finally also covered by the invention if two or more acoustic horns that lead to the separate partial openings on the housing front are associated with one loudspeaker. In this alternative of the invention too, however, provision is made for the arrangement or positioning surface for the partial openings on the housing front that is supplied by the multiple partial openings to be considerably smaller in total than the sound exit surface of the loudspeaker. Otherwise, the advantage of a gain in positioning surface on the housing front aimed at by the invention would not be achieved.

The speech station according to the invention comprises an in particular parallelpipedal housing. These are block-like elements of low height, comparatively greater depth and great width. They are designed in rack-like manner, suitably for rack-like insertion.

The speech station according to the invention has a housing front and a rear housing side. On the housing front numerous operator controls, connectors and multiple displays are tightly packed. The operator controls are in particular programmable. At least some of the operator controls are programmable. "Programmable" means that different functions can be assigned to the operator controls by a selection, i.e. by programming. To this end, programmability can occur at the speech station itself, or with the aid of a switching station to which the speech station is connected. As a rule, the possibility of programmability covers different functions being able to be associated with the operator controls. For example, a particular selector key after actuation—depending on programming—can establish an audio connection either with a first other speech station or with a second other speech station.

The speech station according to the invention comprises multiple displays. The displays comprise readouts that display information and/or parameters and/or functions that are or can be associated with the operator controls. In particular, the displays may comprise regions or portions that are also in a spatial connection—and additionally in a connection as regards content—with the respective operator control. The user of a speech station can in this respect e.g. recognize what operator control has what function by glancing at a display.

For example, a speech station according to the invention may comprise a plurality of selector keys that as a result of actuation ensure a listen and/or talk connection with another speech station. On the display—in a direct spatial association with the individual operator controls—it can be indicated with which other speech station, before or after actuation of a particular operator control, this speech station can establish an audio connection. For this, for example user names of the persons who are active at the other speech station may be indicated on the display. Also alternatively names, identifiers, numbers or the like may be assigned to the speech stations.

The selector keys may for example include three positions, namely a middle position or inoperative position, into which the selector key is biased. Each selector key may also comprise two end positions or two operating positions, for example an upper and a lower operating position or switching position. To this end, provision may be made for the selector key to have to be kept pressed in order to perform a particular function. Thus, for example a selector key, starting from a middle position, can be deflected upward or alternatively downward, wherein upon actuation of the selector key along a direction upward a talk connection, and upon actuation of the same selector key downward into the other operating position a listen connection, is obtained in the same other speech station.

The listen and/or talk connection of the speech station according to the invention to a selected other speech station of the intercom network is provided by means of a switching station. The intercom network is administrated there.

The speech station according to the invention has a plurality of connectors on its rear housing side. These include for example power-supply connectors, data cable connectors, BNC connectors and the like. In particular, the connectors for connecting this speech station to the switching station are also found here.

Moreover, for the description of a speech station and the explanation of the features thereof, reference is made to the patent applications of the Applicant that are listed above, the content of which is hereby also referred to in full for the purpose of reference and inclusion of individual features described therein in the claims of the present patent application, in order to avoid repetition.

The speech station according to the invention makes it possible to provide a listen and/or talk connection with a selected other speech station of the intercom network. However, the invention also covers speech stations that in addition to the transmission of audio data can also transmit and/or receive video signals and/or data signals along with it. For example, the invention also covers speech stations that can additionally display or reproduce video signals on a display installed on the speech station, or on a readout.

The data, signals or information also transmitted in the course of providing a listen and/or talk connection may be used e.g. for transmitting status information. For example, an item of information, such as "button 3 now illuminated in green", can be transmitted to a particular speech station of the intercom network.

According to an advantageous configuration of the invention, the opening is formed by a narrow elongate slot. This provides the possibility of making the opening particularly small and at the same time ensuring a sufficiently large opening cross-section for the sound generated by the loudspeaker to pass through.

Finally, as a result of this on one hand the necessary space requirement for the opening on the housing front can be minimized. On the other hand, an opening formed in this manner may also be bridged or extended over by another element, e.g. by a grip element, without this adversely affecting the audio properties of the speech station.

According to a further advantageous configuration of the invention, the slot extends in the vertical direction or substantially in the vertical direction. As a result, there is the possibility of positioning the opening as close as possible to lateral wall portions of the housing and configuring the entire arrangement surface on the housing front for positioning operator controls and displays with a maximum uninterrupted width.

In a further advantageous configuration of the invention, the opening cross-section of the opening amounts to less than half, further advantageously less than a third, further advantageously less than a quarter, further in particular less than a fifth, further in particular less than a sixth, further in particular less than a seventh, of the sound exit surface. Thus the opening is provided with a clear width or a clear cross-section that is considerably smaller than the sound exit surface of the loudspeaker.

Owing to the fact that the opening cross-section is considerably smaller than the sound exit surface, a high-quality loudspeaker can be used for the speech station and at the same time, without any loss of audio quality at the speech station, a positioning or arrangement surface for operator controls, displays, connectors, sockets or the like that is enlarged compared with the prior art can be obtained on the housing front.

In a further advantageous configuration of the invention, the housing front has a rectangular or substantially rectangular basic form. The speech station according to the invention can as a result be dimensioned and formed based on speech stations of the prior art. This makes it possible to resort to conventional components and elements, e.g. conventional fastening elements for fastening a speech station in a rack or holding frame or mounting frame.

In a further advantageous configuration of the invention, the opening is arranged close to a lateral edge of the base surface. As a result, the arrangement surface or positioning surface for operator controls, displays, connectors and sockets or other function elements on the housing front can be kept free of interruptions and maximized.

According to a further advantageous configuration of the invention, provision is made for the loudspeaker to be arranged close to a lateral wall or wall face of the housing. As a result, there is the possibility of particularly simple mounting of the loudspeaker, since it can be fixed or mounted for example directly on, or in a simple manner relative to, a lateral housing wall of the housing. On the other hand, as a result there is the possibility of arranging grip elements by which the housing can be grasped by an operator [on] the housing front and positioning these grip elements such that they extend over or cover the opening and at the same time—in conventional manner—are mounted laterally on the housing.

In a further advantageous configuration of the invention, an acoustic horn is arranged between the sound exit surface of the loudspeaker and the opening. This acoustic horn may comprise one or more walls on which the sound is reflected and conducted. The acoustic horn has a cross-section that decreases from the sound exit surface of the loudspeaker toward the opening, in particular decreases continuously.

The wall of the acoustic horn may in this case resort to wall elements of the housing, e.g. on side walls of the housing. The acoustic horn may also be formed exclusively or partially of elements separate from the walls of the housing of the speech station. For example, the walls of the acoustic horn may be formed of metal or plastics material.

The acoustic horn may be adapted to or optimized for the particular requirements of conducting sound from the sound exit surface of a loudspeaker to the small opening. In particular, the choice of material and the geometry of the wall regions of the acoustic horn can be optimized with regard to the audio requirements of the speech station.

According to the invention, provision is made in particular for the housing front to be provided by a flat or substantially flat surface. The term "substantially flat" in this case takes into account the fact that slight deviations from this flatness are permitted owing to the function elements, operator controls, connection sockets or displays. For example, operator controls can project from the front housing side, which is otherwise flat, and extend out toward the user of a speech station according to the invention.

According to a further advantageous configuration of the invention, the positioning of the loudspeaker has been carried out in the following particular manner: the loudspeaker is positioned such that the sound exit surface is arranged inclined relative to the housing front. In particular, the sound exit surface of the loudspeaker is arranged inclined at an acute angle, of for example 45° or approximately 45°, relative to the housing front.

As a result, firstly particularly advantageous possible ways of fastening, arranging and mounting the loudspeaker, but at the same time particularly advantageous possible ways of arranging and fastening and designing an acoustic horn that is advantageously to be used become possible.

According to an advantageous configuration of the invention, the sound exit surface of the loudspeaker is oriented parallel to or substantially parallel to a lateral housing wall of the housing.

The sound exit surface in this embodiment is oriented at approximately 90° or substantially perpendicular to the housing front. Again, conducting of sound from the loudspeaker to the housing front can take place with the aid of an acoustic horn already mentioned previously.

According to a further advantageous configuration of the invention, the selector keys are designed in a particular manner. Accordingly, at least some of the selector keys may assume different positions, namely advantageously three different positions. Covered by this is a first, in particular inactive, middle position into which a selector key is biased. Furthermore, a selector key has two active operating positions or end positions, namely a first, e.g. upper, end position and a second, e.g. lower, end position.

By the action of a finger or a hand of a user, the latter can either—starting from a middle position—displace the selector key into an upper end position or alternatively into a lower end position and thereby actuate it. As soon as the selector key has reached an upper end position, the operator of this speech station has obtained a direct talk connection to the operator of another speech station. If the selector key is displaced into the other end position, the operator obtains a direct listen connection to this other speech station. The corresponding talk or listen connection is maintained only as long as the operator holds the selector key in its end position, that is to say urges it into the end position. As soon as the operator releases the selector key, the selector key automatically returns into its middle position due to spring biasing.

According to a further advantageous configuration of the invention, two loudspeakers are mounted on the speech station. As a result, in particular stereo reception of audio signals becomes possible.

Furthermore, the invention also permits the use of at least one loudspeaker in a microphone mode. As a result, audio monitoring of the speech station becomes possible.

According to a further advantageous configuration of the invention, fastening portions that project laterally outward are mounted on the housing front. These may further advantageously have in each case openings for fastening means to pass through. As a result, based on conventionally designed speech stations, particularly advantageous and simple fastening of the speech station according to the invention to an mounting frame, e.g. a rack, is made possible.

According to a further advantageous configuration of the invention, at least one microphone is fixed on the speech station. Alternatively or additionally, at least one connector for a microphone is fixed on the housing front of the speech station. This connector may for example be formed by a conventional microphone socket. This connector makes it possible to connect a microphone directly to the housing front.

According to a further advantageous configuration of the invention, at least one connector for a headset is arranged on the housing front. This provides a comfortable way of connecting a headset, i.e. a listen/talk unit, to the speech station.

According to a further advantageous configuration of the invention, the opening is covered by a grip element. A grip element of this type enables an operator to grasp or grip the speech station easily and permits comfortable handheld transport.

The grip element, or in the event that multiple grip elements are present, the multiple grip elements, is/are advantageous in particular for the purpose of mounting or dismantling the speech station relative to an mounting frame or assembly frame. The grip elements in this case can be arranged and positioned such that they partially or completely engage beyond the opening. As a result, particularly space-saving accommodation of an aperture of the opening in the housing front for the sound generated by the loudspeaker to emerge from becomes possible.

As a result, the positioning or arrangement surface for accommodating operator controls and/or displays on the housing front can be maximized and/or optimized still further.

The invention furthermore achieves the object set above with the features of claim 17.

In order to avoid repetition, reference is made to the above statements, that apply analogously also to the invention according to claim 17.

In the case of the speech station according to claim 17, provision is made for the direct listen and/or talk connection of the speech station according to the invention to a further speech station of the intercom network to take place not with the interposition of a switching station, but for the two speech stations—or plurality of speech stations of an intercom network—to be connected together directly, without the interposition of a switching station.

Further advantages of the invention will become apparent from the dependent claims that are not cited, and also with reference to the following description of the embodiments illustrated in the drawings.

The Figures show in:

FIG. 1 a schematic front view of the housing front of an embodiment of the speech station according to the invention, FIG. 1*a* an enlarged, schematic separate representation of a selector key approximately according to the encircled partial representation Ia in FIG. 1, for explaining the different postures and positions of an actuating element of a selector key, FIG. 2 a schematic rear view of the speech station of FIG. 1, FIG. 3 the speech station of FIG. 1 in a partially sectional schematic top view approximately along section line in FIG. 1, numerous individual parts having been omitted for clarity, FIG. 4 an embodiment of an intercom network in a block-circuit diagram-like, schematic representation using three speech stations according to the invention, FIG. 5 a schematic view of a housing front of a speech station of the prior art, FIG. 6 an enlarged partially sectional, schematic detailed representation of the attachment region of a loudspeaker in a representation according to FIG. 3, approximately along the encircled partial representation VI in FIG. 3, FIG. 7 in a representation according to FIG. 6, an alternative arrangement of a loudspeaker with a changed inclination of a sound exit surface of the loudspeaker relative to the housing front, FIG. 8 a partially sectional, schematic, truncated and perspective view of a further embodiment of a speech station, in which grip elements that cover the openings for the sound to emerge from are mounted on the housing front, FIG. 9 a representation similar to the representation of FIG. 7, a further alternative arrangement of a loudspeaker with a different orientation of the sound exit surface of a loudspeaker in relation to the housing front, with here—in comparison with the representations of FIGS. 6 and 7—the other, namely in relation to FIG. 3 the right-hand, side wall of the housing being illustrated, and with the sound exit surface of the loudspeaker of FIG. 9 being oriented substantially parallel to a side wall of the housing.

embodiments of the invention are described by way of example in the following description of the figures, also with reference to the drawings. In this case, for clarity—also insofar as different embodiments are concerned—identical or comparable parts or elements or regions are designated with identical reference characters, sometimes with lower-case letters added.

Features that are described only in relation to one embodiment may in the context of the invention also be provided in any other embodiment of the invention. embodiments that are altered this way—even if not shown in the drawings—are likewise within the scope of the invention.

All the disclosed features are per se essential to the invention. The disclosure content of the associated priority documents (copy of the prior application) and also of the cited publications and of the described devices of the prior art is also hereby incorporated in full in the disclosure of the application, also for the purpose of jointly including individual or several features of these documents in one or in several claims of the present application.

Figure 4:
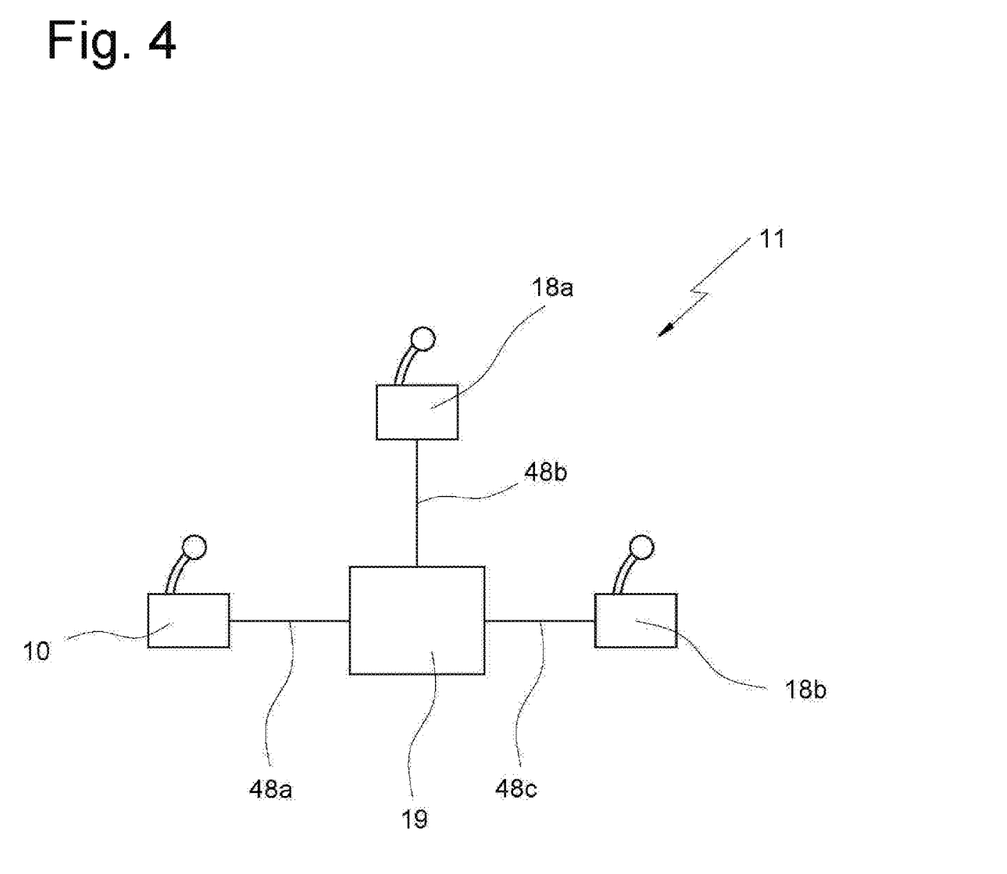

The speech station in the embodiment in the drawings is designated in its entirety by 10. The speech station is a component or member of an intercom network 11, as is illustrated with reference to the block diagram of FIG. 4. An intercom network 11 of this type comprises a switching station 19 and a plurality of speech stations 10, 18*a*, 18*b* that are connected together by means of connecting lines 48*a*, 48*b*, 48*c*. A speech station 10, 18*a*, 18*b* is connected in each case directly to the switching station 19 via a connecting line 48*a*, 48*b*, 48*c*. The switching station 19 administers this intercom network 11.

The intercom network 11 serves for audio transmission and offers communication options for example for networks that are to be set up temporarily, such as for example for live events, such as music events or sports events.

Figures 1, 1A:
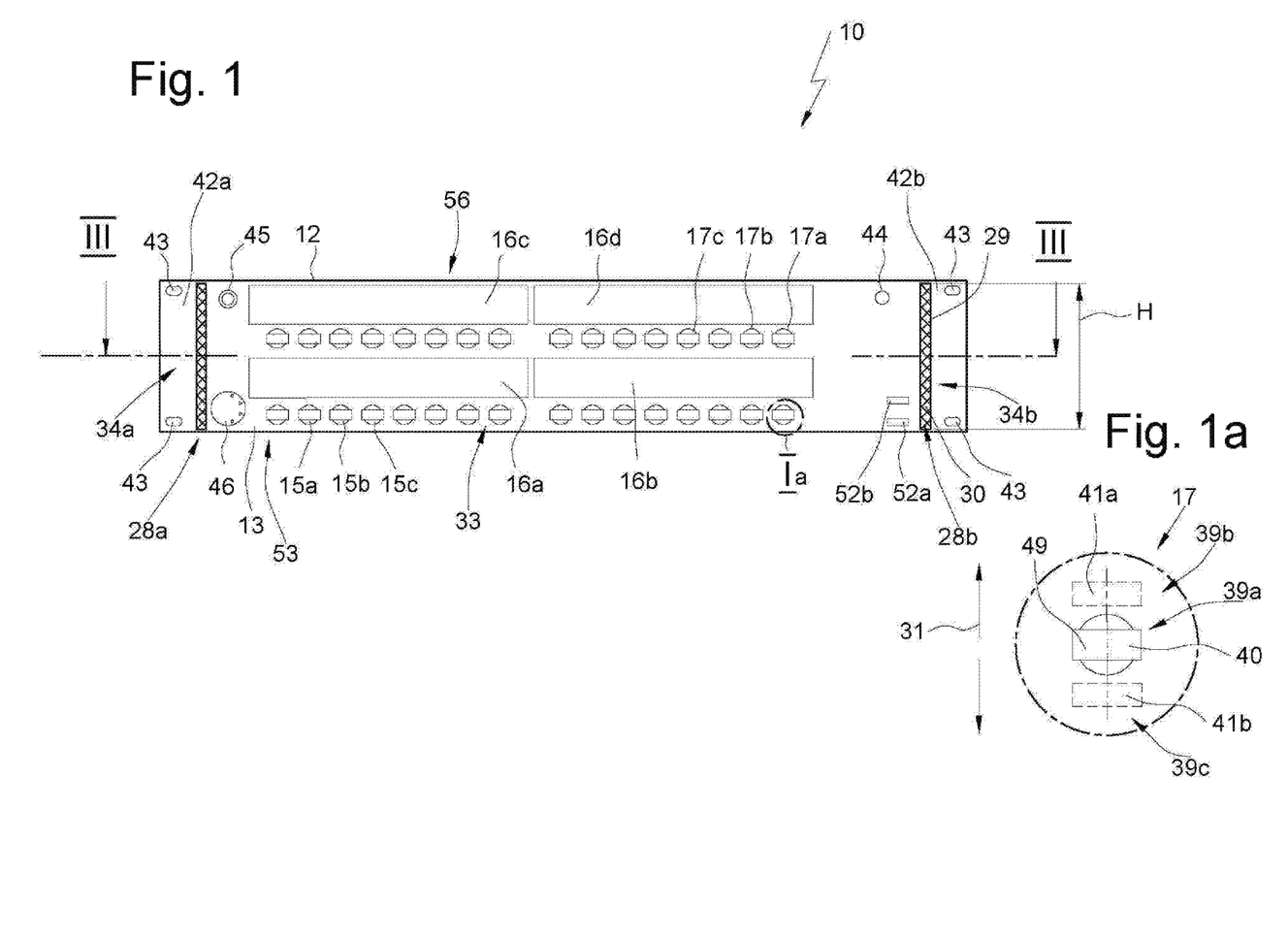
Figure 2:
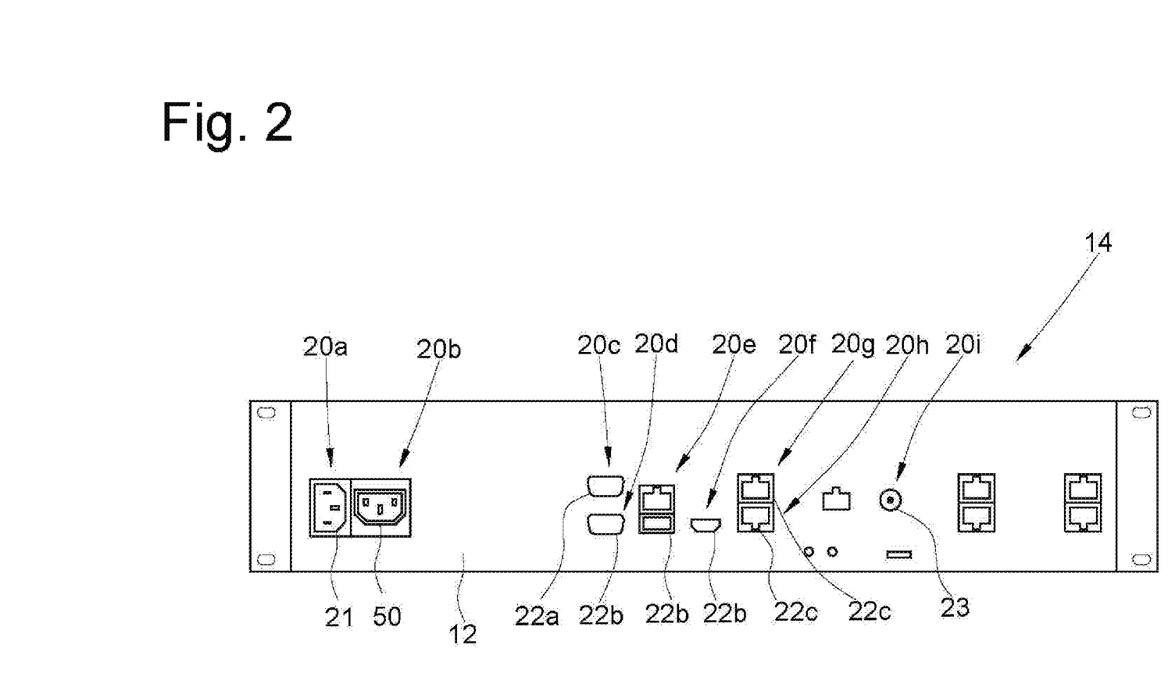

According to FIG. 1, the speech station 10 according to the invention comprises a housing 12 that is formed in substantially parallepipedal manner. FIG. 1 illustrates the front 13 of the housing 12, FIG. 2 illustrates the rear side 14 of the housing 12, and FIG. 3, according to this embodiment of the invention, illustrates a cross-section through the housing 12, so that the housing front 13, rear housing side 14 and a seat 25 can be recognized here within the housing 12.

According to FIG. 1, a plurality of operator controls 15*a*, 15*b*, 15*c* are mounted on the housing front 13, merely some of that are provided with reference characters. The operator controls in the embodiment are mounted in two rows and in a total of four groups.

The operator controls 15*a*, 15*b*, 15*c* are in each case designed as selector keys 17*a*, 17*b*, 17*c*, 17, with again only some selector keys being provided with reference characters.

Such a selector key 17 comprises in each case—according to FIG. 1*a*—an actuating lever 49, which is illustrated on an enlarged scale according to the encircled partial representation of FIG. 1*a*. Accordingly, the actuating lever 49 comprises a lever element 49 extending toward the observer of FIG. 1 and projecting from the housing front 13, which element can be gripped at its free end by the finger of a user, and starting from a middle position 40 can be displaced in the vertical direction 31 into an upper end position 41*a* or counter to the vertical direction 31 into a lower end position 41*b*. The deflected lever element 49, which is located in the end position 41*a*, 41*b*, is spring-biased in the middle position 40. Therefore, as soon as the operator releases the lever 49, it is automatically returned into the middle position 40.

As soon as an operator has actuated a selector key 17, 17*a*, 17*b*, 17*c* and has displaced it into its end position 41*a*, 41*b*, a direct listen and/or talk connection is produced with the selected speech station 18*a*. Thus for example in the end position 41a a talk connection and in the end position 41b a listen connection can be obtained. The different operating modes are also referred to as speak/listen mode.

With regard to FIG. 1a, it is noted that the actuating element 49 can assume three different positions 39a, 39b and 39c.

Furthermore, four displays 16a, 16b, 16c, 16d are mounted on the housing front 13 of the housing 12 in the embodiment. The number of displays 16a, 16b, 16c, 16d and the number of selector keys are of course arbitrary.

In principle, however, the aim of the speech station 10 according to the invention is for a plurality of operator controls 15a, 15b, 15c, 15d and displays 16a, 16b, 16c, 16d to be able to be arranged tightly packed on the housing front 13, in order on one hand to accommodate a plurality of the operator controls, displays and connectors, but on the other hand also to make possible comfortable and reliable operation, and to make it possible to recognize the elements.

In the embodiment of FIG. 1, a plurality of connectors are provided on the housing front 33 in addition to the selector keys 17, 17a, 17b, 17c: for example, FIG. 1 shows a microphone connector 45 and a headset connector 46. The microphone connector 45 may be designed as a socket for an audio jack and the headset connector 46 may be designed as an XLR male socket connector.

Finally, in the embodiment of FIG. 1 two USB connectors 52a, 52b are also provided on the housing front 13.

The housing front 13 furthermore comprises fastening portions 42a, 42b projecting laterally outward, in which a number of openings 43 are provided. The speech station 10 may be fastened to a rack or mounting frame by means of the lateral fastening portions 42a, 42b. Fastening means, not shown, may extend through the openings 43 for this purpose.

Between the lateral fastening portions 42a, 42b and the arrangement surface 53 for the operator controls 15a, 15b, 15c, 15d and for the displays 16a, 16b, 16c, 16d there are two openings 28a, 28b, which are formed in the type of slots 30a, 30b. In this case, these are exit openings for sound that is generated by loudspeakers 24a, 24b.

Figure 3:
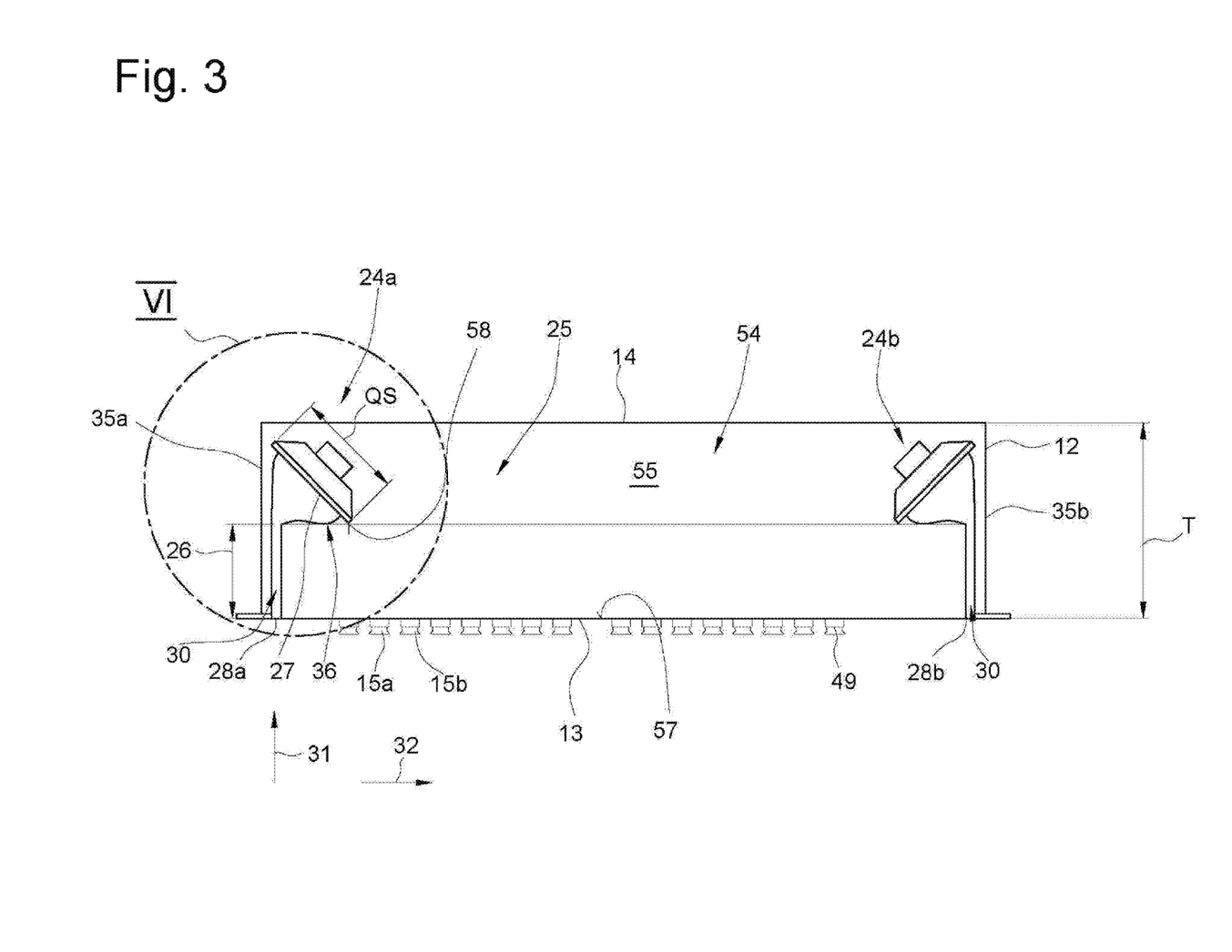

As best becomes clear according to the representation in FIG. 3, the interior 54 of the housing 12 is surrounded by the housing front 13 and the rear housing side 14 and the lateral wall faces 35a, 35b of the housing 12. Furthermore, the housing 12 has a bottom wall 55 and a top wall 56 that is not shown in FIG. 3, and is indicated in FIG. 1. The interior 54 is therefore delimited by these six wall portions.

The numerous electronic components, such as printed circuit boards, processors, capacitors, optionally transformers and other electronic components and also cables and conductors, which are to be arranged in the interior 54 of the housing 12 are not shown. It is however apparent to the person skilled in the art that an electrical conductor runs to each connector 45, 46, 52a, 52b on the housing front 13 to each operator control 15a, 15b, 15c, 15d.

The same applies to the connectors to be arranged on the rear housing side 14. For this reason, there is not inconsiderable cabling effort within the housing 12.

As the embodiment of FIG. 3 makes clear, a first loudspeaker 24a and a second loudspeaker 24b are mounted in the interior 54 of the housing 12. In further embodiment of the invention that are not shown in the figures, the speech station 10 comprises only one loudspeaker 24.

The loudspeaker 24a is arranged spaced apart by an offset 26 from the housing front 13. The offset 26 in the embodiment is approximately half the depth T of the interior 54 of the housing 12. The offset 56 is measured between the inner side 57 of the housing front 13 and that portion 58 of the loudspeaker 24 that comes closest to the inner side 57.

Advantageously, the offset 26 in speech stations according to the invention is at least 10%, further in particular at least 20%, further in particular at least 25%, further in particular at least 30%, of the depth T of the interior 54 of the housing 12.

In the embodiment of FIG. 3, the loudspeaker 24, 24a, 24b is a conventional so-called moving-coil loudspeaker. As a result of using such a loudspeaker type, very good fidelity of audio reproduction can be achieved. It is also possible to resort to conventional loudspeakers.

Such moving-coil loudspeakers have a diaphragm, the dimension of which determines the size of the loudspeaker. According to the embodiment of FIG. 3, the loudspeaker 24 has a transverse extent QS that corresponds to the external diameter of the substantially circular diaphragm. The loudspeaker 24a therefore has a sound exit surface 27 that is just as large as the diaphragm. The sound exit surface 27 therefore has a diameter that corresponds to the transverse extent QS.

Figure 6:
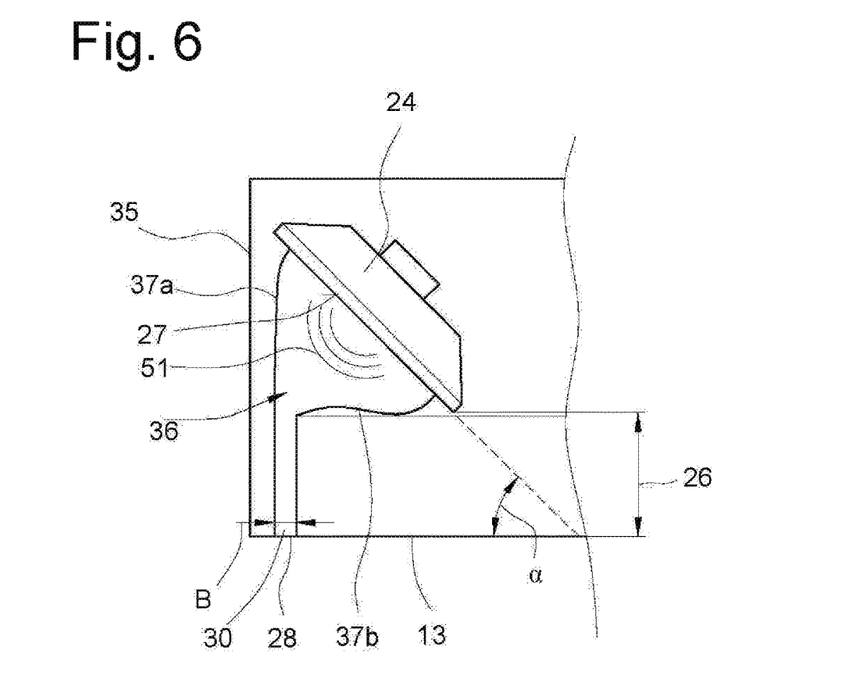

The sound generated by the loudspeaker 24a—as is best made clear with reference to the embodiment in FIG. 6 that is illustrated in greater detail—is designated with 51 in FIG. 6 as a sound wave. These sound waves are conducted to the opening 28 or the slot 30 starting from the exit surface 27 of the loudspeaker 24a. This is done in the embodiment according to the figures by providing an acoustic horn 36. This has in particular partly curved wall portions 37a, 37b, so that the interior or the internal cross-section of the acoustic horn 36 becomes continuously smaller from the sound exit surface 27 up to the opening 28.

As a result, the opening 28 may have an opening cross-section 29 that is considerably smaller than the sound exit surface 27.

In the embodiment of FIG. 6, the opening 28 has a width B (cf. FIG. 6) and a height H (cf. FIG. 1) that results in an opening cross-section 29 as a product of height H and width B that is considerably smaller than the sound exit surface 27 of the loudspeaker 24a. The sound exit surface 27 has a size of ×(QS:2)2.

Even at a first glance, considering FIGS. 1 and 6 and comparing the sound exit surface 27 with the opening 28 shows that the sound exit surface 27 is considerably larger than the opening 28.

Thus the opening 28 on the housing front 13 can be kept very small. This maximizes the arrangement surface 53 on the housing front 13. Therefore a plurality of operator controls 15a, 15b, 15c, 15d, in particular selector keys 17, 17a, 17b, 17c and displays 16a, 16b, 16c, 16d and also connectors 52a, 52b, 45, 46, can be accommodated on the housing front 13.

In the embodiment of FIG. 6, the sound exit surface 27 is arranged at a 45° angle (reference character α) relative to the housing front 13.

Figure 7:
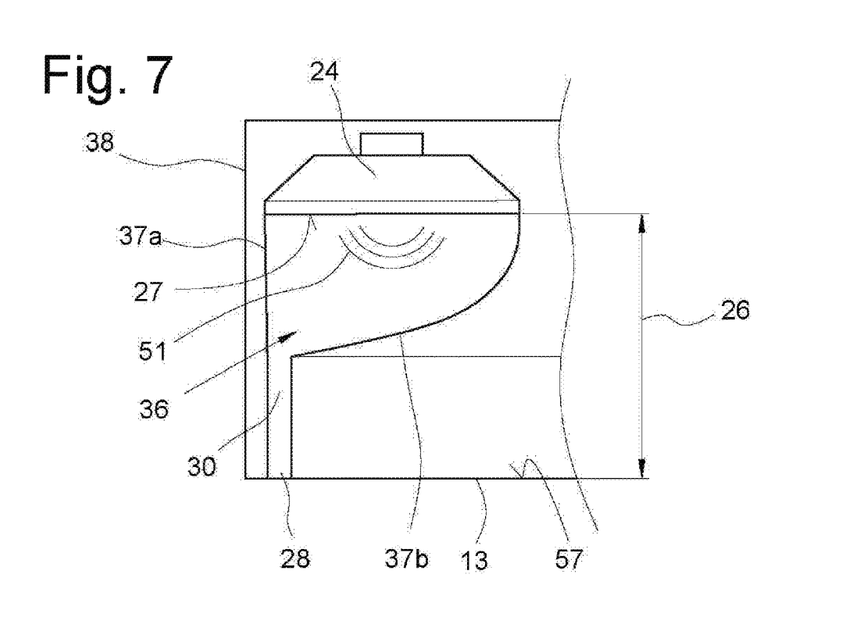

In the embodiment of FIG. 7, the loudspeaker 24 on the other hand is positioned differently: here the sound exit surface 27 is oriented parallel to the housing front 13. Here too, however, a very great offset 26 between the inner side 57 of the housing front 13 and the sound exit surface 27 is provided. In the embodiment of FIG. 7 as well, an acoustic horn 36 with wall portions 37a, 37b is provided.

In further embodiments of the invention not shown in the figures, the acoustic horn 36 may also be formed or partially formed by inner faces of portions 35a, 57 of the housing 12.

Figure 9:
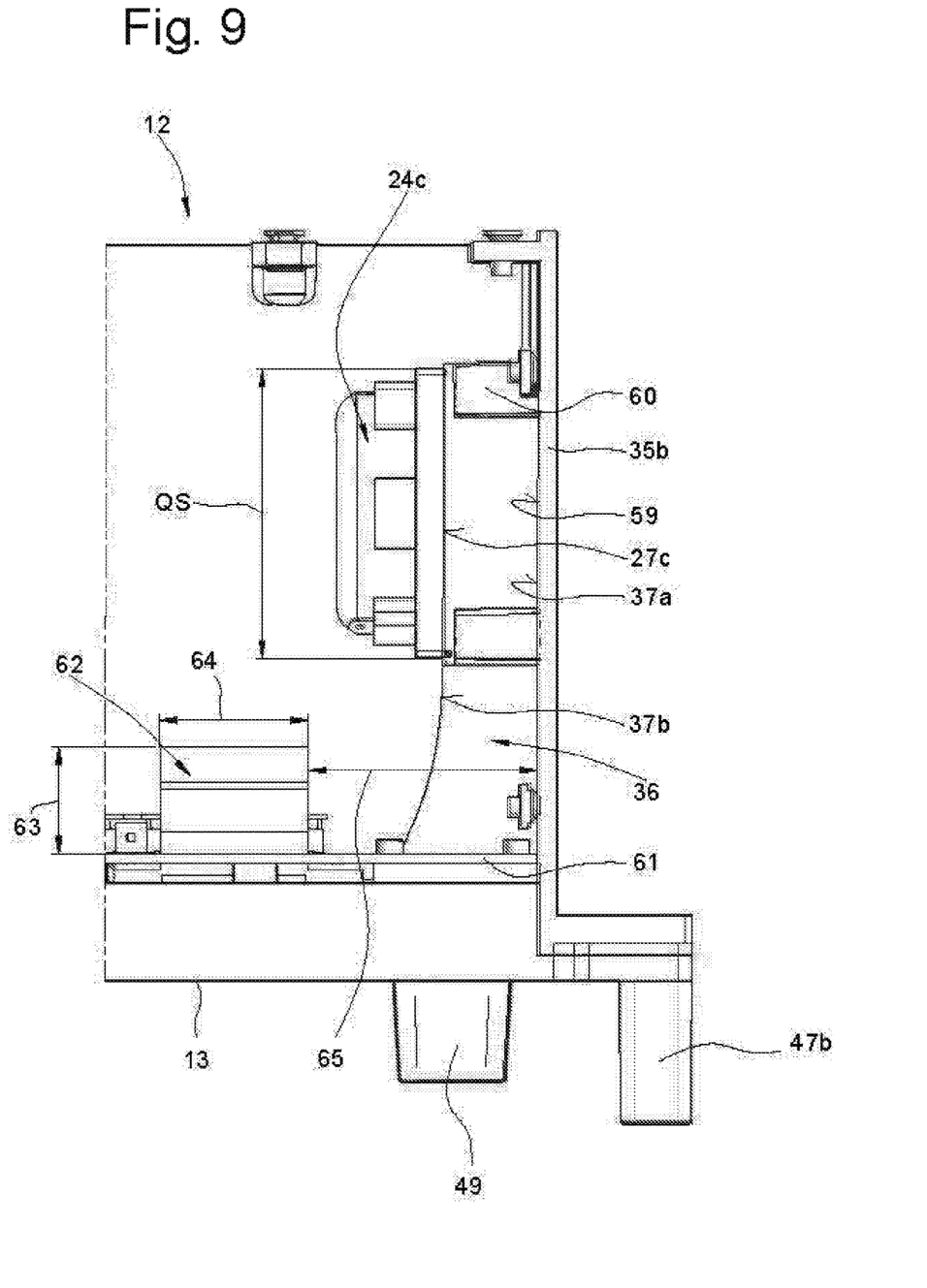

In the embodiment of FIG. 9, a representation that is slightly changed compared with the representations of FIGS. 6 and 7 is shown:

Here the lateral, right-hand—relative to FIG. 3—wall surface 35b of the housing 12 and a corresponding right-hand—relative to FIG. 3—portion of the housing front 13 are illustrated.

The loudspeaker 24c has a sound exit surface 27c oriented parallel to the side wall 35b.

The acoustic horn 36 is provided here by wall portions 37a, 37b, with the wall portions 37a of the acoustic horn 36 corresponding to the inner side 59 of the side wall 35b.

Fastening elements 60 can be discerned, which makes it possible for the loudspeaker 24c to be fastened directly to the side wall 35b of the housing 12.

In FIG. 9, the reference character 61 designates a printed circuit board on which a plurality of electronic components can be mounted. For example, 62 designates an electronic component that has a predetermined height 63 and a predetermined width 64.

On looking at FIG. 9, it can be recognized that the clearance remaining between the component 62 and the housing side wall 35b has an internal width 65 that is smaller than the transverse extent QS of the loudspeaker.

Due to the rearward displacement according to the invention or the offset rearward of the loudspeaker 24c relative to the housing front 13, there is therefore now the possibility of arranging the electronic component 62 at the position illustrated in FIG. 9 on the board 61.

It should be noted, that in FIG. 9 the sound exit opening 19, 20, 30 on the housing wall 12 is not shown for reasons of clarity, but is of course present.

According to FIG. 1, the opening 28 is provided as a cutout in the housing front 13 in the type of a slot 30. This is formed elongated in the vertical direction 31. As a result, a very narrow, small opening on the housing front 13 is made possible.

The housing front 13, as FIG. 1 makes clear, comprises a rectangular base surface 33. The positioning of the two slots 30a, 30b that is provided in the region of the lateral edge 34a, 34b of the base surface in the embodiment is advantageous. The arrangement surface 53 for the operator controls 15a, 15b, 15c, 15d and the displays 16a, 16b, 16c, 16d can in this manner be maximized free from interruption.

For completeness, the rear side of the housing 12 will also be described with reference to the embodiment of FIG. 2. Here there are a plurality of connectors 20a, 20b, 20c, 20d, 20e, 20f, 20g, 20h, 20i, which are illustrated merely by way of example. For example, there can be seen a power-supply connector 21 that makes it possible to connect the speech station 10 to a 220 V mains cable. Furthermore, a connector 50 for supply connection loop-through is provided. In this respect, a further electric or electronic device that requires mains voltage can be connected to the connector 50.

Furthermore, data cable connectors 22a, 22b, 22c are mounted on the rear housing side 14. These here may be various sockets for different plug formats, such as for example HDMI, GPIO, dual Ethernet, 4-Wire analog or other connectors. FIG. 2 also clearly shows a BNC connection socket 23 for connecting a BNC cable.

Figure 8:
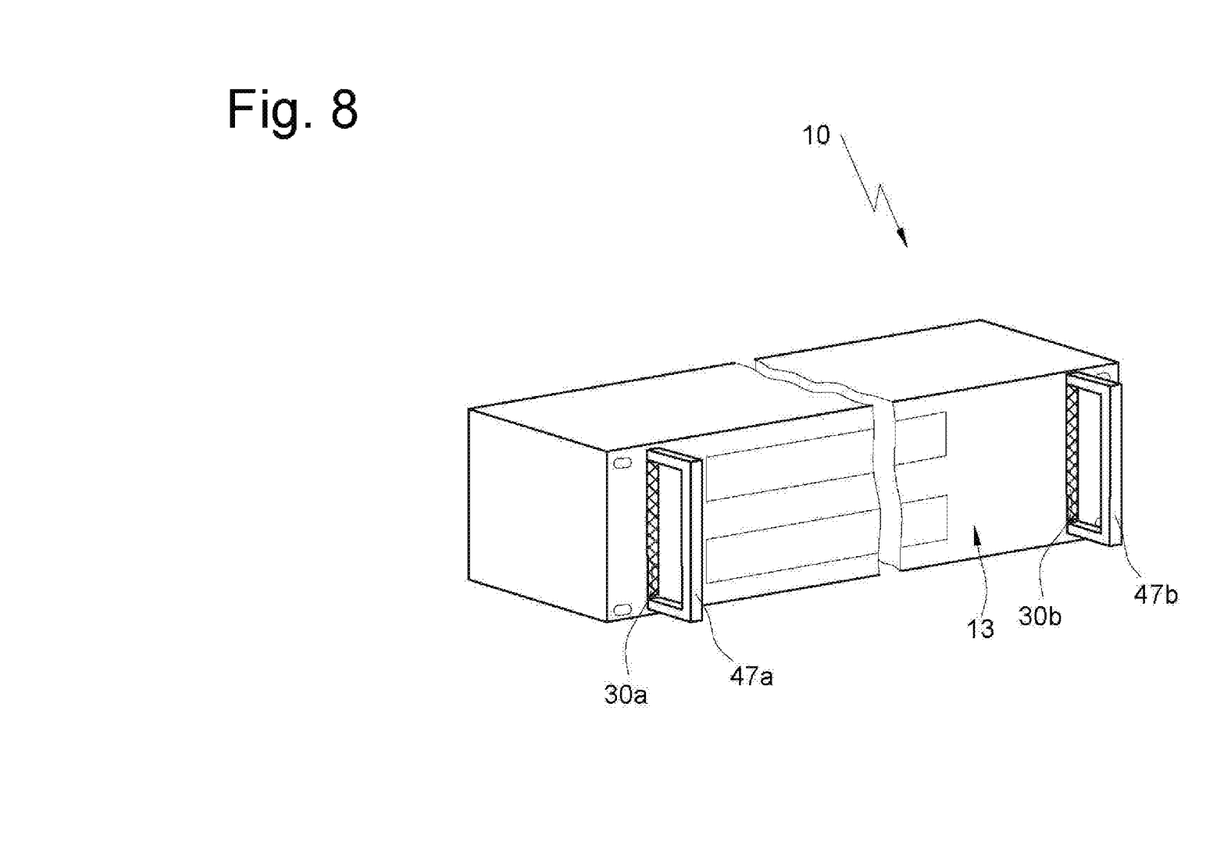

As the embodiment of FIG. 8 lastly makes clear, in a further embodiment grip elements 47a, 47b that cover the slots 30a, 30b are provided. The grip elements 47a, 47b are likewise arranged in the region of the lateral edges 34a, 34b of the base surface 33 of the speech station 10.

Figure 5:
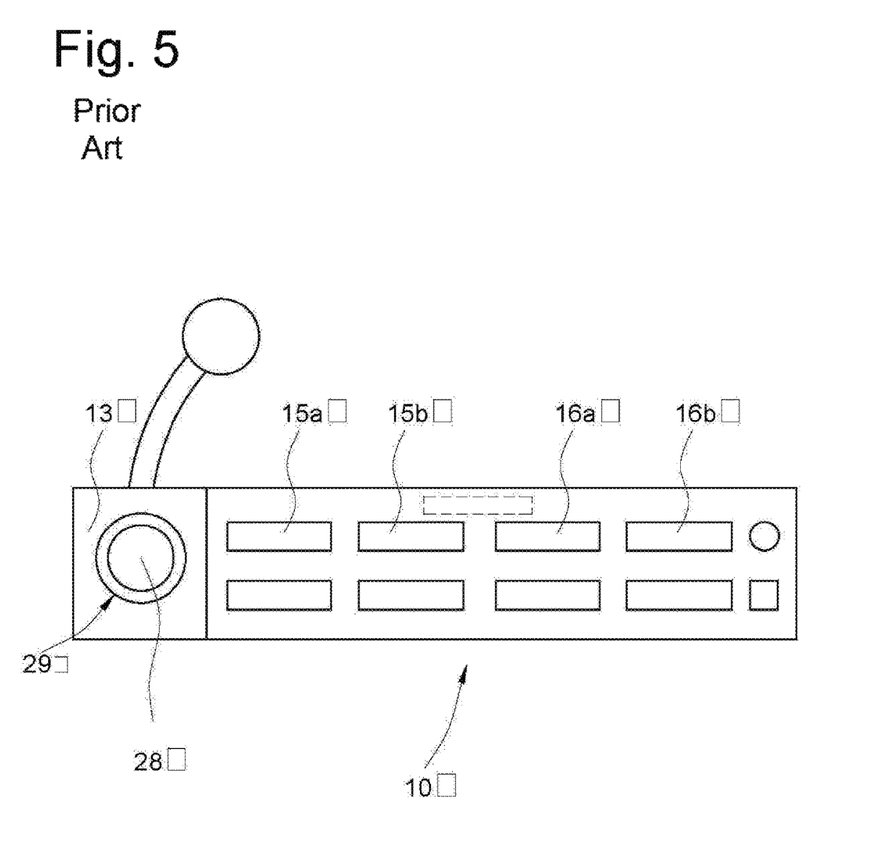

Below, a speech station 10' of the prior art will be discussed briefly with reference to FIG. 5:

With regard to the speech station 10' of the prior art in FIG. 5, identical reference characters, in each case with an apostrophe added, will be used for simplicity.

The speech station 10' according to FIG. 5 in the prior art, too, already has programmable operator controls 15a', 15b', which can also function as displays 16a', 16b'. Here, an opening for a fixedly installed and non-illustrated loudspeaker, is provided at 28'.

The opening cross-section 29' of the opening 28' for the sound to emerge from here is made as large as the loudspeaker not visible in FIG. 5 and located in the direction of viewing of the observer behind the housing front 13' in FIG. 5.

In the embodiment according to the invention, the opening 28 in the housing front 13 is kept free from any elements. The invention however also covers the opening 28 being completely or partially covered or occupied by loudspeaker grilles or mats of plastics material or textile materials, as are also usually used for other sound exit openings for loudspeakers in housings.

Figure 10:
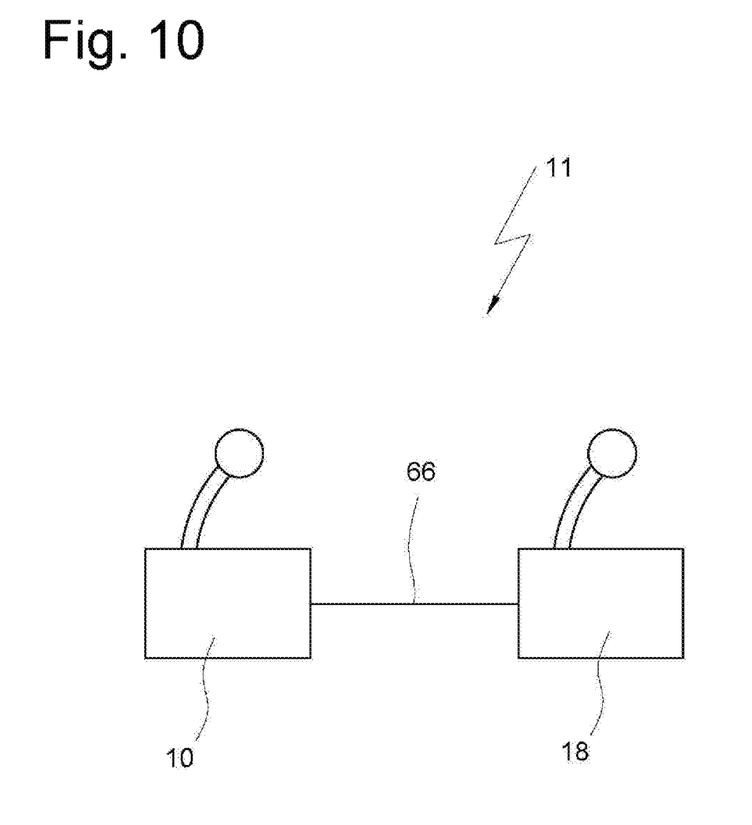
FIG. 10 shows a further embodiment of an intercom network according to the invention using two speech stations according to the invention in a representation according to FIG. 4, with the two speech stations of FIG. 10 being connected together directly without the interposition of a switching station.

In addition, it should be explained herewith with reference to FIG. 10 that in a further embodiment according to the invention of an intercom network 11 a speech station 10 according to the invention is connected to another speech station 18 of the intercom network 11 directly via a connecting line 66, without the interposition of a switching station.

The invention claimed is:

1. A speech station for an intercom network, the station comprising:
   a housing having a housing front and a housing rear side;
   a plurality of selector keys and multiple displays tightly packed on the housing front, the speech station as a result of a selector key being actuated by an operator providing a direct listen and/or talk connection to a selected other speech station of the intercom network via a switching station;
   a plurality of connectors mounted on the housing rear side; and
   a loudspeaker fixed on the speech station in a seat between the housing front and housing rear side offset rearward from the housing front, the loudspeaker having a sound exit surface from which the sound is propagated to an opening in the housing front, the opening having an opening cross-section that amounts to only a fraction of the sound exit surface.

2. The speech station according to claim 1, wherein the opening is formed by a narrow slot.

3. The speech station according to claim 2, wherein the slot is vertical.

4. The speech station according to claim 1, wherein the opening cross-section amounts to less than half of the sound exit surface.

5. The speech station according to claim 1, wherein the housing front has a substantially rectangular base surface.

6. The speech station according to claim 5, wherein the opening is close to a lateral edge of the base surface.

7. The speech station according to claim 1, wherein the loudspeaker is close to a lateral wall face of the housing.

8. The speech station according to claim 1, further comprising:
   an acoustic horn between the sound exit surface of the loudspeaker and the opening.

9. The speech station according to claim 8, wherein the acoustic horn has walls formed by components of the housing and/or by an element separate from the housing.

10. The speech station according to claim 1, wherein the sound exit surface is inclined relative to the housing front at an acute angle or the sound exit surface of the loudspeaker is substantially parallel to a lateral wall face of the housing.

11. The speech station according to claim 1, wherein at least one of the selector keys is movable between three different positions and is biased into a middle one of the positions.

12. The speech station according to claim 1, wherein the speech station has two such loudspeakers.

13. The speech station according to claim 1, further comprising:
fastening portions projecting laterally outward on the housing front and each formed with openings for fastening means to pass through.

14. The speech station according to claim 1, further comprising:
a microphone and/or a connector for a microphone fixed on the housing front of the speech station.

15. The speech station according to claim 1, further comprising:
a connector for a headset on the housing front.

16. The speech station according to claim 1, further comprising:
a grip element covering the opening.

17. A speech station for an intercom network, the station comprising:
a housing having a housing front and a rear housing side;
a plurality of selector keys and multiple displays tightly packed on the housing front, the speech station as a result of a selector key being actuated by an operator providing a direct listen and/or talk connection to a selected other speech station of the intercom network;
a plurality of connectors mounted on the rear housing side; and
a loudspeaker fixed on the speech station in a seat between the housing front and housing rear side, offset rearward from the housing front, the loudspeaker having a sound exit surface from which the sound is propagated to an opening in the housing front, the opening having an opening cross-section that amounts to only a fraction of an area of the sound exit surface.

* * * * *